United States Patent [19]

Meinke et al.

[11] 4,166,261

[45] Aug. 28, 1979

[54] ELECTROMAGNET HAVING A MOVABLE ARMATURE AND A PLURALITY OF ENERGIZING SOURCES

[75] Inventors: Peter Meinke, Grossinzemoos; Gerhard Flachenecker, Ottobrunn, both of Fed. Rep. of Germany

[73] Assignee: Maschinenfabrik Augsburg-Nurnberg Aktiengesellschaft, Munich, Fed. Rep. of Germany

[21] Appl. No.: 832,056

[22] Filed: Sep. 12, 1977

Related U.S. Application Data

[63] Continuation-in-part of Ser. No. 548,489, Feb. 10, 1975, abandoned.

[30] Foreign Application Priority Data

Feb. 11, 1974 [DE] Fed. Rep. of Germany ....... 2406429

[51] Int. Cl.² .............................................. H01F 7/10
[52] U.S. Cl. ...................................... 335/246; 335/268
[58] Field of Search ................ 335/266, 267, 268, 246

[56] References Cited

U.S. PATENT DOCUMENTS

| 2,736,843 | 2/1956 | Douglas et al. .................. 335/245 X |
| 3,553,618 | 1/1971 | Lang ..................................... 335/244 |

FOREIGN PATENT DOCUMENTS

| 287772 | 1/1963 | Netherlands ............................. 335/266 |
| 454644 | 6/1935 | United Kingdom ...................... 335/244 |

*Primary Examiner*—George Harris
*Attorney, Agent, or Firm*—Alan H. Levine

[57] ABSTRACT

An electromagnet including a magnetizable yoke, an exciter coil system, and a movable armature. The end surface of at least one pole shoe carried by the yoke is divided into at least two discontinuous partial surfaces separated by a space. At least one control coil system includes a coil at least partially within the space and arranged to produce magnetic flux passing through the partial surfaces in opposite directions.

21 Claims, 15 Drawing Figures

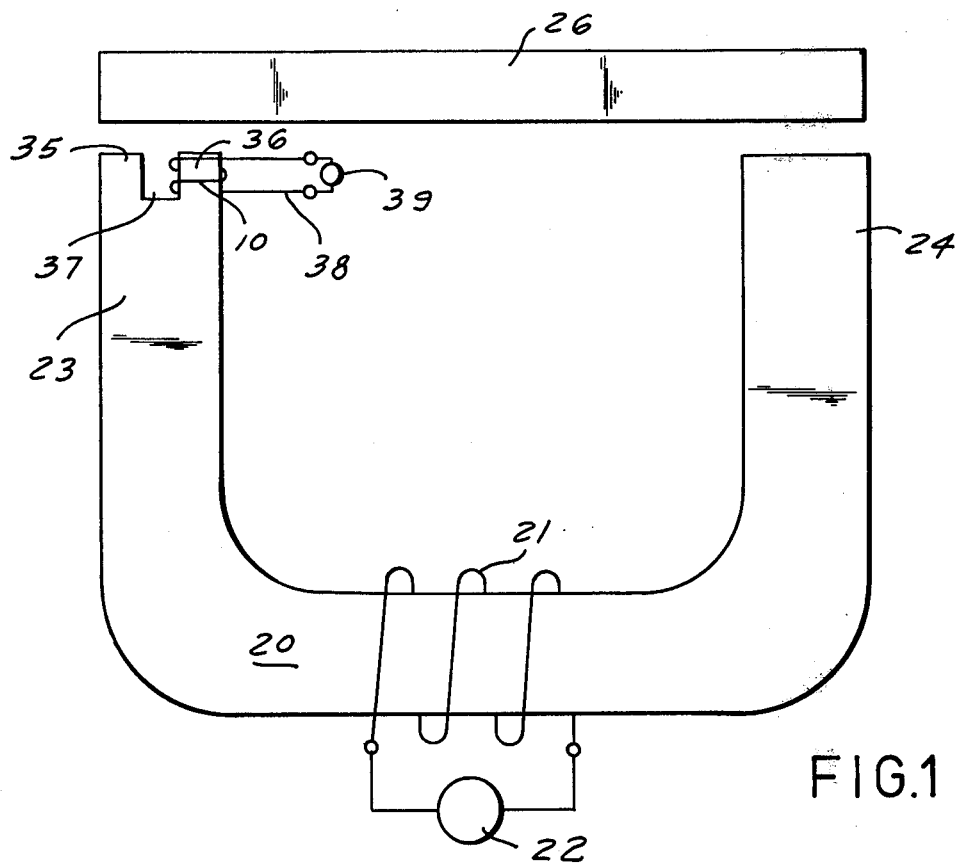
FIG.1
FIG.2
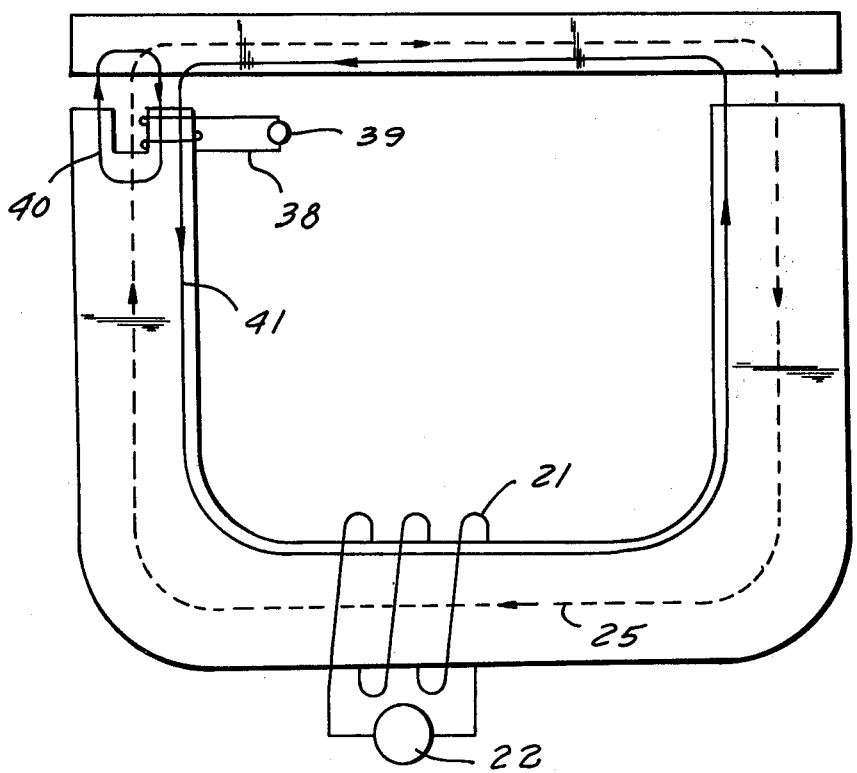

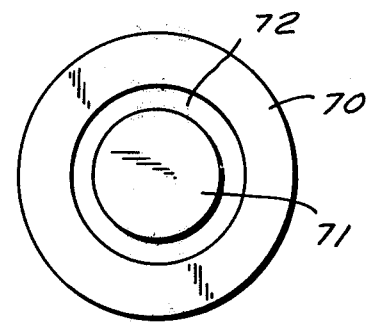
FIG.10a
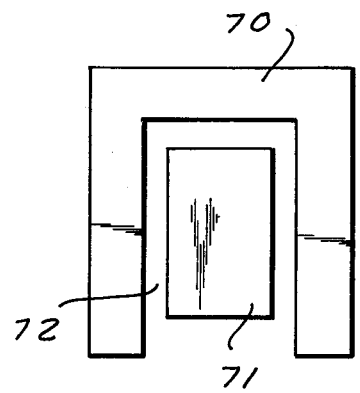
FIG.10b
FIG.9
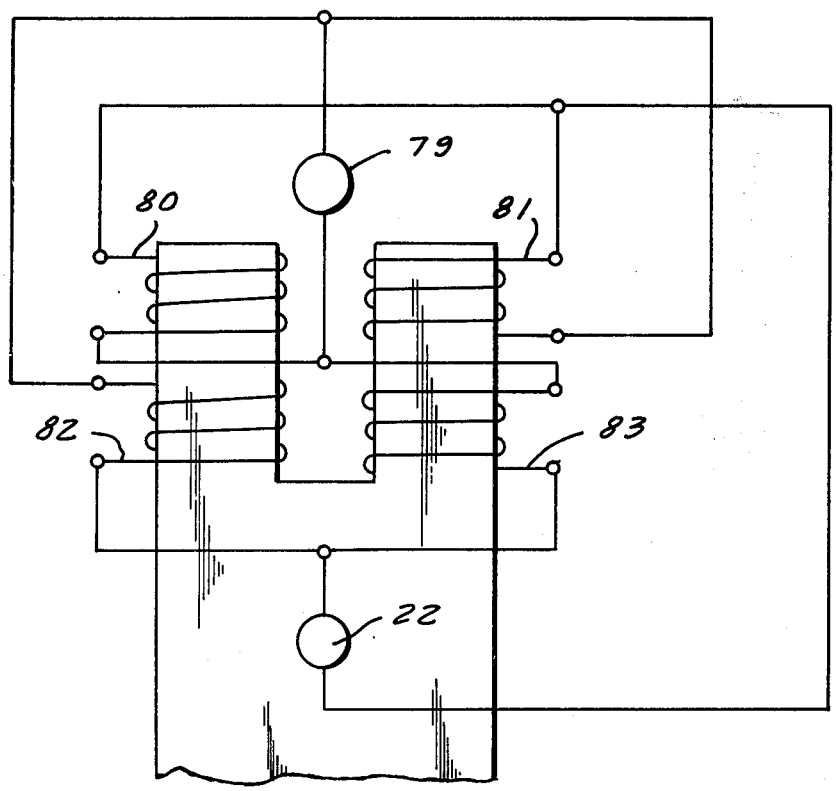

ELECTROMAGNET HAVING A MOVABLE ARMATURE AND A PLURALITY OF ENERGIZING SOURCES

This application is a continuation-in-part of copending application Ser. No. 548,489, filed Feb. 10, 1975 now abandoned.

The present invention relates to an electromagnet consisting of a magnetizable yoke having at least two pole shoes and at least two coil systems traversed by currents, and a movable armature of magnetizable metal, the end surfaces of at least one of said pole shoes being divided into at least two discontinuous partial surfaces.

In order to facilitate an understanding of the invention from the very start, the background of the invention will first of all be explained on basis of FIGS. 1 to 4, in which:

FIG. 1 shows an electromagnet which is first of all to be considered in its conventional part, and with which first of all the expressions used in connection with the invention will be explained;

FIG. 2 is an electromagnet with the lines of flux drawn in;

FIGS. 5 to 13 show details in connection with the invention.

Figure 3:
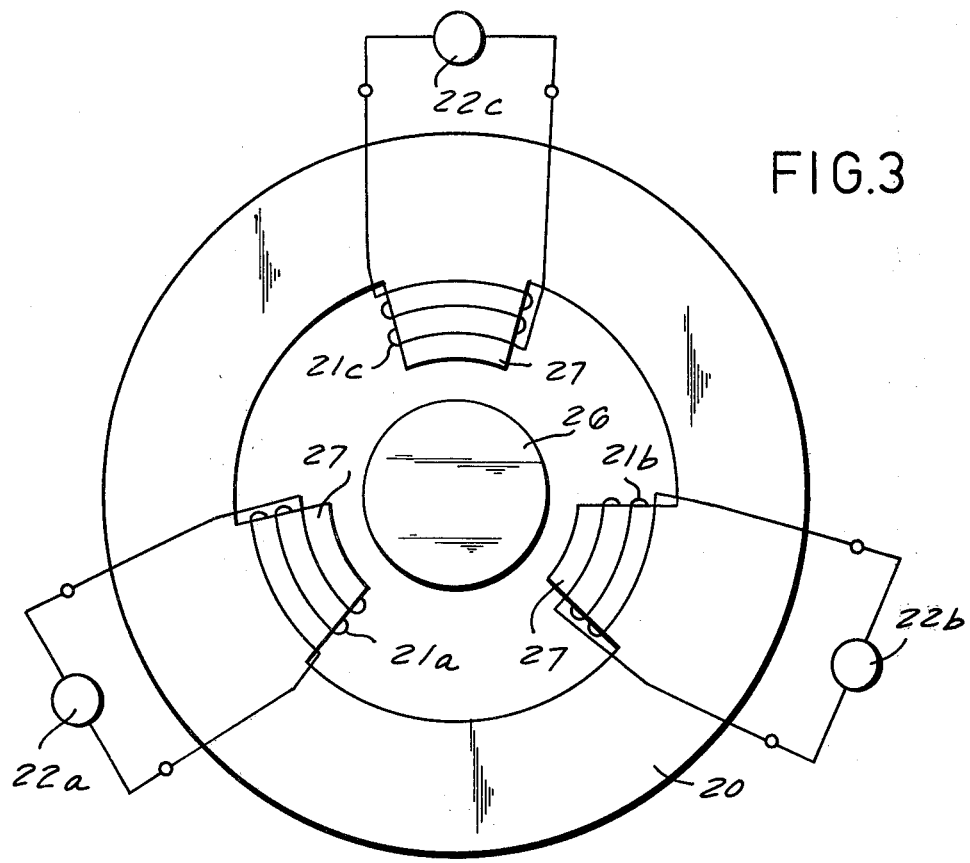
FIG. 3 shows another arrangement in which the yoke of the electromagnet has three pole shoes.

The yoke 20 of magnetizable material can assume any known form. The electromagnet has, in known manner, an exciter coil 21 or an exciter coil system through which the exciter source 22 passes an exciter current in order to produce a magnetic field in the yoke. The exciter coil system and the exciter source together form the exciter system.

Pole shoes 23 and 24 are connected in known manner with the yoke 20. The magnetic field produced in the yoke by the exciter coil system emerges from one pole shoe and passes, in accordance with the dashed lines 25 of flux shown in FIG. 2, into the second pole shoe. The arrow ends of the lines of flux show the direction of the lines of flux. Between the pole shoes there is a magnetizable armature 26 which may consist in known manner of magnetizable material, for instance iron, but may also contain conductor loops as in the case of motors. The armature is movable and is traversed by the magnetic flux 25 of the exciter system. The magnetic flux entering the armature exerts a force on the armature as does the flux emerging from the armature. If B is the magnetic flux density present in the air gap between pole shoe and armature, then the force acting on the armature is proportional to the value $$F = \int_S B^2 \, dS \quad (1)$$

This force F acts on the portion S of the surface of the armature into which the magnetic flux emerging from the adjacent pole shoe enters or from which the flux entering the adjacent pole shoe emerges. The unit ds is an area of the surface S.

Figure 4:
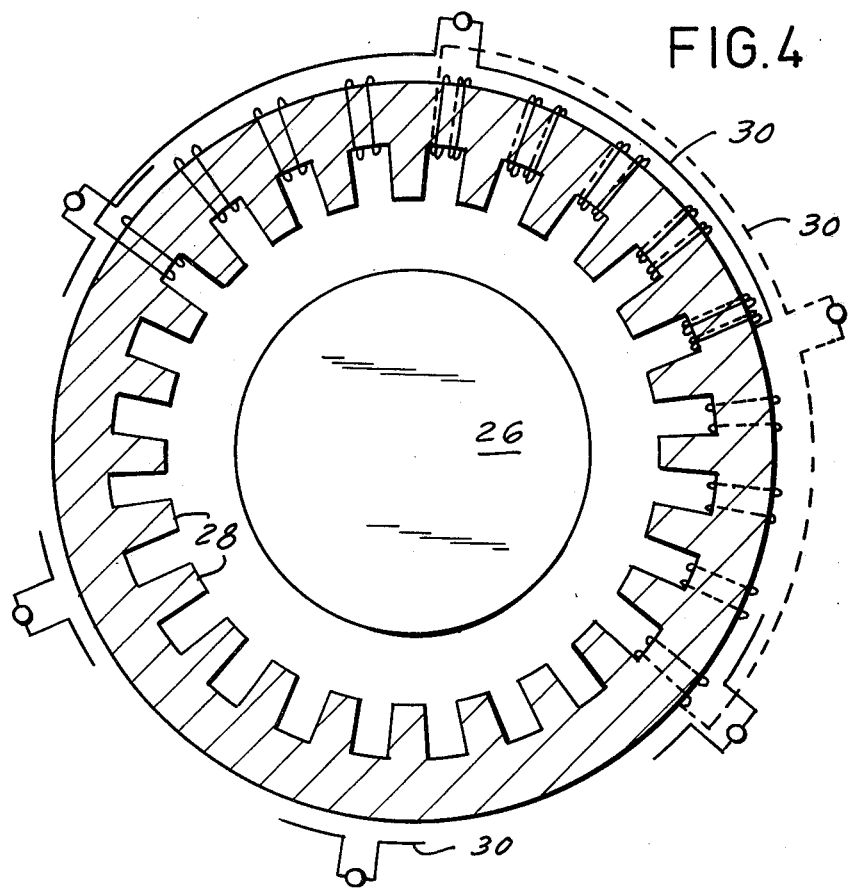
FIG. 4 is still another arrangement with a plurality of pole shoes.

If the exciter source is a multi-phase source, for instance a three-phase source system, then, for example, in a manner known from the art of electric motors, the yoke 20 carries three pole shoes 27 as in FIG. 3 and there are three coils or systems 21a to 21c which are fed by the three sources 22a to 22c. There is known also a three-phase source system as shown in FIG. 4 in which the yoke 20 has numerous pole shoes 28 and a coil system with six separate exciter coils wound around the yoke between adjacent pole shoes 28, the magnetic flux of adjacent pole shoes being different in phase. In connection with the invention, there is also of interest the electromagnet of a linear motor which is obtained from FIG. 4 with the pole shoes being arranged alongside of each other on a linear yoke. A pole shoe in the sense of the invention is therefore in its most general form a continuous structure of magnetizable material from which a magnetic flux passes into the armature, the magnetic flux produced by the exciter system emerging in the same direction in all parts of its end surface.

There are now applications in which it is necessary that a second magnetic force or a plurality of additional forces act on the armature in addition to the force produced by the exciter system. In this connection the additional forces, referred to as control forces, are produced by additional magnetic fields which pass from one or more pole shoes of the yoke through the armature. These magnetic fields are produced by additional currents, known as control currents, these currents being produced in the exciter coil system or in additional coil systems by additional sources known as control sources. The coils participating in the control are referred to as control coils or control coil systems. Each control coil system together with the corresponding control source forms the control system belonging to said control source.

The magnetic support of a rotating armature, as shown in FIGS. 3 and 4, is an example for the use of exciting force together with control forces. The exciting force is applied for driving the rotating armature and in addition to the drive force, control forces are necessary in order to stabilize the position of the armature. Another example which can be considered is an arrangement in accordance with FIG. 1 in which the armature is an acoustic generator which is excited by the exciter system to produce a low-frequency oscillation and then also to effect additional low-frequency oscillations at other frequencies.

The idea that the second magnetic force can be produced by a second electromagnet is known, for instance, in the case of a rotating armature by a magnetic bearing separated from the drive system. This however involves a relatively large expense.

In published German Patent Application No. 2,114,040 it has already been proposed in the case of a magnetically supported rotor to adapt the electromagnetic means of a stabilizing device of the magnetic bearing to accept a multi-phase alternating current and thereby drive the rotor in the manner of a hystereses or eddycurrent motor. This German Patent Application does not, however, describe any means to solve this problem. If furthermore proposes known means for separating the circuits of the source stabilizing the magnetic support and the multi-phase source producing the drive.

It is furthermore known form the loudspeaker art to excite a magnetizable diaphragm by magnetic forces to carry out oscillations at various frequencies by passing currents of several frequencies into the same exciter coil.

The particular problem of electromagnets with superposed magnetic fields is that the components of the force exerted between the pole shoes and the movable armature are dependent on the current of more than one source of the coil systems. That is, in case of a rotatable body besides a tangential force component for driving purposes a radial component originated by the exciter system and a second radial component produced by the control system for positioning will act on the body. In the general case the two force components will be dependent on both, the exciting current and the control current, that is, if the control current is changed in order to influence the positioning force component, the driving force component will be changed as well.

For better understanding, the magnetic force produced by the magnetic flux of two coils will be duduced from an arrangement as shown in FIG. 1.

The end surface of the pole shoe 23 is considered to be divided into two partial surfaces 35 and 36 separated from each other by a space 37. A control coil 38 is wound around one of the partial pole pieces 36 and connected to a control source 39. The magnetic field produced by the control coil 38 has thus field lines shown in FIG. 2 by the full lines 40 and 41. This field is superposed on the field 25 produced by the exciter coil 21, that is the magnetic flux density B of the flux from the pole shoe to the armature will be equal to the sum of the flux densities $B_1$ and $B_2$ of the two origins.

$$B = B_1 + B_2 \tag{2}$$

in which $B_1$ is the flux produced by the exciter system and $B_2$ the flux produced by the control system. In accordance with equation (1) the force acting on the armature will be $$F = \int_S (B_1 + B_2)^2 \, dS \tag{3}$$

$$F = \int_S B_1^2 \, dS + \int_S 2B_1 B_2 \, dS + \int_S B_2^2 \, dS$$

The force F having thus three components:

$$F_1 = \int_S B_1^2 \, dS, \tag{4}$$

$$F_2 = \int_S 2B_1 B_2 \, dS \quad \text{and}$$

$$F_3 = \int_S B_2^2 \, dS$$

The first of which (referred to as a partial force of the first type) represents the force which is produced by the exciter system alone and the third force (referred to as a partial force of the third type) is the force which is produced by the control system alone.

The second force $F_2$ (referred to as the partial force of the second type) is produced when the two fluxes are simultaneously present and it represents a normally undesirable injurious coupling of the two systems. It contains, for instance, sum frequencies and difference frequencies if the processes coupled have a sinusoidal dependence on time as in the case of two tones in a loudspeaker. In the case of the rotor driven by the first force, there is added in this case to the third portion of force serving for the control the second portion, which due to the factor $B_1$ contains the drive frequency and produces a vibration of the magnetically supported shaft or even makes magnetic support impossible in case of very small distances between pole shoe and armature.

In the following the second force $F_2$ is considered more deeply where in order to simplify the formulas, it is assumed in what follows that the air gap between armature and pole shoe is very small and is the same size for the entire end surface of the pole shoe.

In such case, the magnetic fields are homogenous and $B_1$ is a constant. The disturbing force of the second type in equation (4) is then proportional to $$F_2 = 2B_1 \int_S B_2 \, dS = B_1 \phi_2 \tag{5}$$

i.e., proportional to the total flux $\phi_2$ which is produced by the control source 39 with the due cosideration of the different directions of field between pole shoe and armature.

If the field produced by the control source 39 for each partial surface 35, 36 is homogeneous then the force of the second type is $$F_2 = 2B_1(B_{21}S_1 - B_{22}S_2) = 2B_1(\phi_{21} - \phi_{22}) \tag{6}$$

In this equation, $S_1$ is the partial surface with one direction of flow and $S_2$ is the partial surface with the opposite direction of flow; $B_{21}$ is the flux density produced by the control source of the partial surface $S_1$ and $B_{22}$ is the corresponding flux density of the partial surface $S_2$; $\phi_{21}$ is the flux produced by the control source through the partial surface $F_1$ and $\phi_{22}$ is the flux through the partial surface $S_2$. The fluxes $\phi_{21}$ and $\phi_{22}$ being different in magnitude, as can be deduced from the field indicated in FIG. 2 by the lines 40 and 41.

Further, an electromagnet is known in which one pole shoe is subdivided into three equal partial surfaces, each of two outer partial pole pieces being surrounded by an auxiliary coil, fed with dephased current. For this case the equation (6) has the form:

$$F_2 = 2B_1(\phi_{21} + \phi_{22} - \phi_{23})$$

In both above considered cases the force F consequently has the undesired component $F_2$ which makes the arrangements unusable for the purposes related to in this specification.

To avoid the nonlinear dependence of the forces is it known to apply a bias magnetization. In such case, $B_1$ is a flux which is constant in time and which is substantially greater than $B_2$. In equation (3) the third force is then substantially smaller than the second force and becomes practically inactive. The second force then contains in addition to the constant $B_1 1$ all time-dependent fluxes in $B_2$ in linear combination so that all parts of $B_2$ can exert forces which are independent of each other.

A bias magnetization, however, means an additional expense. With a moving armature the biased magnetization produces eddy currents in the armature as a result of which energy is consumed and the armature becomes warm. In case of small distances between the armature and the pole shoe thermal expansion of the armature is not permissible.

It is the object of the present invention to provide the pole shoes and the control system with a form such that the force of the second type contained in equation (3) is sufficiently inactive so that the forces of the first and third types become active.

(A) a magnetizable yoke carrying at least two pole shoes, (b) an exciter system for magnetizing said yoke, including an exciter coil and an exciter source for applying electric currents to said exciter coil (c) a magnetizable armature arranged between said pole shoes and movable with respect to said shoes, (d) the end surface of at least one of said pole shoes being divided into at least two discontinuous partial surfaces separated by a space, each partial surface forming the end surfaces of partial pole pieces, respectively (e) control systems including control coil systems and control source for applying electric current to said control coils (f) a pair number of said pole pieces being associated to said control systems, each of said pole pieces being wound by at least one of said control coils respectively, (g) the partial surfaces of and the magnetic flux applied to each member of each of said pairs having the same magnitude thus, the total magnetic flux produced by the control coil systems emerging in one direction for the pole shoe system is of the same magnitude as the total flux emerging in the other direction through the pole shoe system.

For an arrangement according to the invention the force $F_2$ of second type will therefore be expressible in the form:

$$F_2 = 2B_1 \sum_{i=1}^{n} (\phi_{2i} - \phi_{2(i+1)}) \quad (7)$$

considering the equation (6). n+1 being the number of partial pole pieces surrounded by control coils, whereas i, i+1 is used for each pair system with equal current and partial surface. Since the total flux produced by the control coils of such a pair is null the force component $F_2$ disappears and the total force exerted by the magnetic field includes only components of the first and third type of equation (3), each of which is dependent only either on the exciter or the control current.

Figure 5:
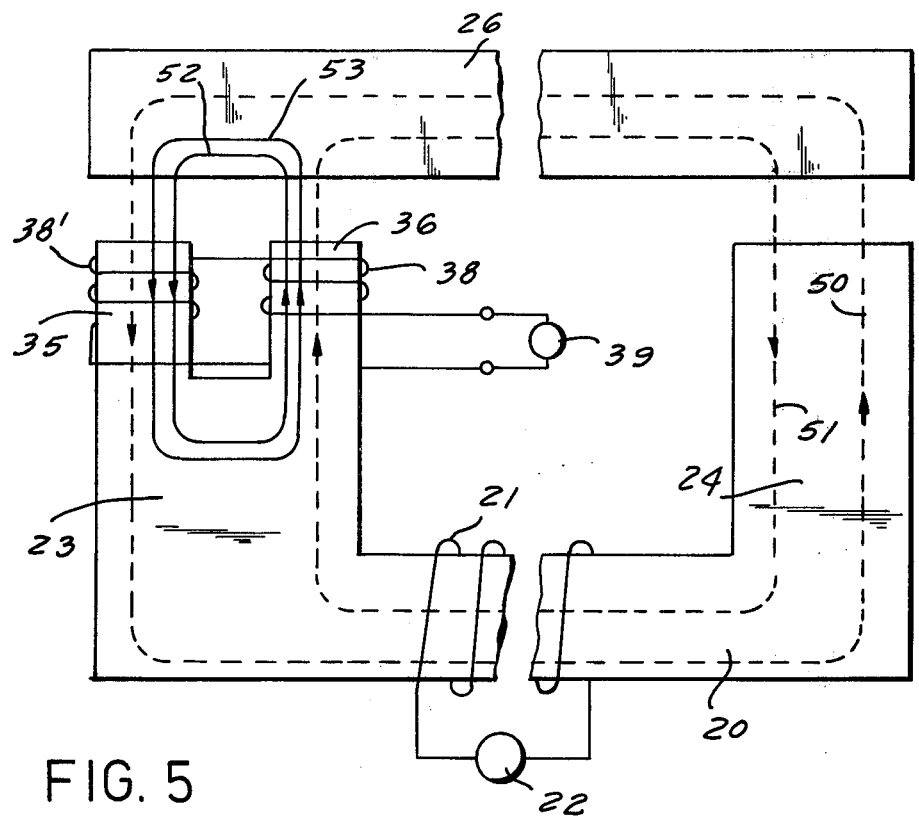

In FIG. 5 is shown an electromagnet according to the invention in which on arrangement shown in FIG. 1 is used where both partial pole pieces 35 and 36 are associated to control coils 38, 38'. The control coils are connected in series and wound in opposite sense with an equal number of windings on each partial pole piece. The fields indicated by dotted lines 50 and 51 passing through both pole shoes 23 and 24 therefore have the same magnitude and opposite direction, i.e. they cancel themselves. The remaining magnetic flux produced by the control coils 38 and 38' is indicated by the full line 52 and 53 and being $\phi_{21}$ (emerging from the partial surface 38) equal to $\phi_{22}$ (entering into the partial surface 38'). Thus $$F_2 = 2 B_1 (\phi_{21} - \phi_{22}) = 0$$

because of $\phi_{21} = \phi_{22}$.

The control coils also might be connected in parallel to the same control source or to different sources. This can be obtained with a double coil in accordance with FIG. 5, one coil being wound around each of the two partial surfaces and the two coils being connected in series, as in FIG. 5, or in parallel with suitable directions of winding.

Figure 6:
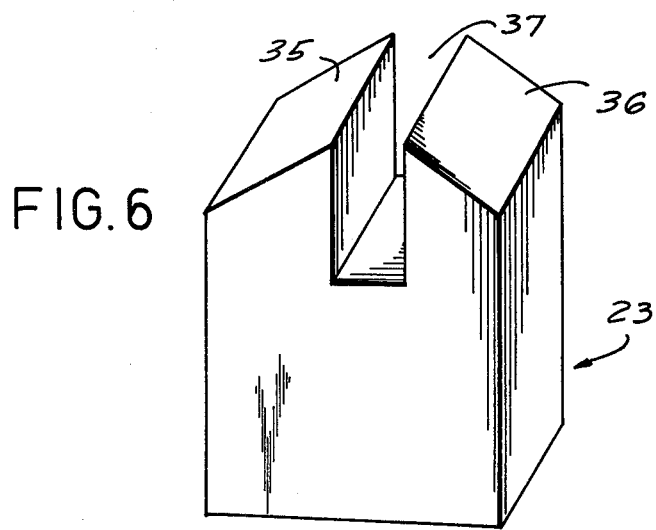

It is sufficient for the pole shoe and the armature to be constructed symmetrically to the linear intermediate sprace. As an example, FIG. 6 shows such a pole shoe with partial surfaces 35 and 36 and intermediate space 37.

With the subdivision of the pole shoe into a plurality of partial surfaces, the forces produced by each partial surface act on the armature at the place where the magnetic flux in question strikes the armature. The force of each partial surface, therefore, has a point of attack on the armature which differs from the forces of the other partial surfaces. Between each partial surface and the armature there are three partial forces described in equation (3). The forces of the second type which, in accordance with the invention, balance each other out only when summed for the pole shoe as a whole, continue however to exist as partial forces for each individual partial surface and have a different direction corresponding to the different sign of $B_2$. These partial forces of the second type produce moments of rotation which act on the armature and affect the movement of the armature additionally and frequently in an undesirable fashion.

In one advantageous embodiment of the invention, therefore the partial surfaces and the control coil systems are so formed that the moments of rotation exerted by the control systems on the armature practically counteract each other.

Figure 7:
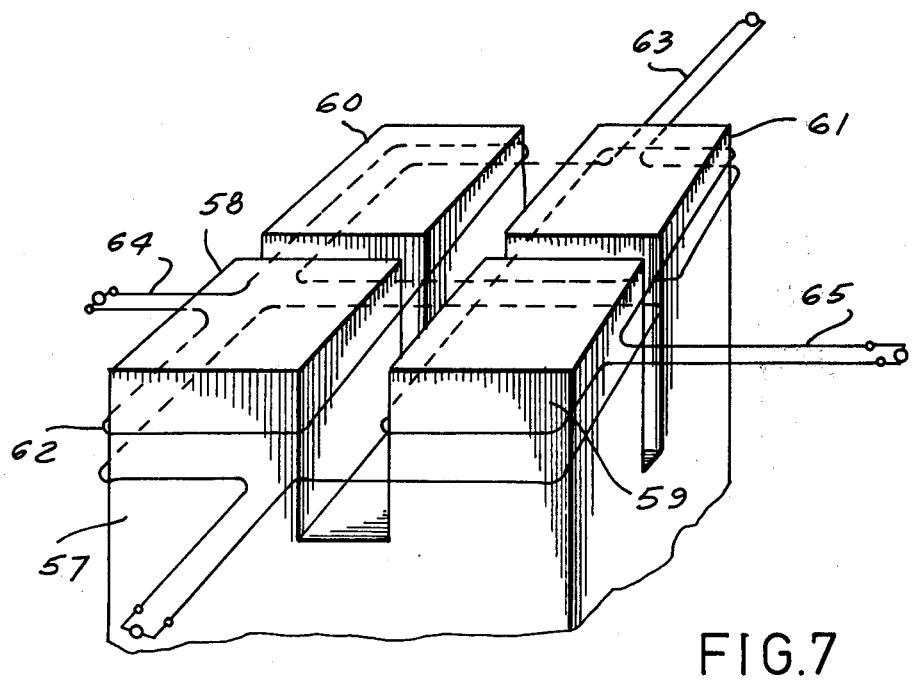

An example with a pole shoe divided into more than two partial surfaces is illustrated in FIG. 7. For simplicity there is shown only the subdivided pole shoe 57 of the electromagnet and one loop of each coil. In this arrangement either two partial pole pieces 58, 59 or all four partial pole pieces 58 to 61 can be provided with control coils as described in the case of FIG. 5. Another possibility is to wind the coil around two partial pole pieces at a time as shown in FIG. 7. In this case it is possible to provide either a pair of coils 62, 63 or two pairs 62–64 arranged as shown, each coil being connected to one current source. These sources being independent one from the other.

The arrangement shows an example with two control systems, i.e. the systems including the coils 62, 63 on one side and the coils 64, 65 on the other side. Each coil pair may, as indicated for the example in FIG. 5, be connected in series or parallel and to one or two sources.

Figure 8A:
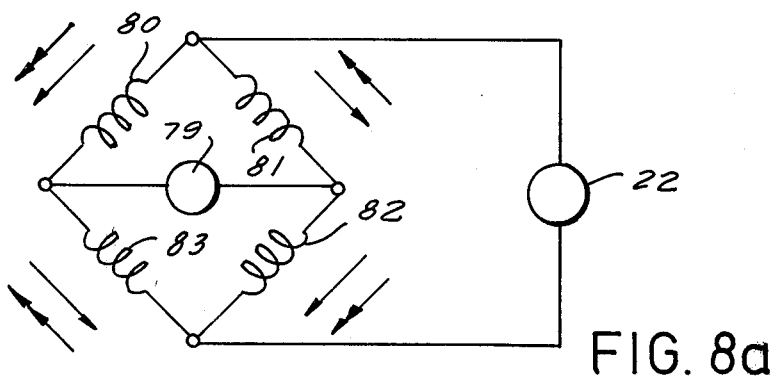
Figure 8B:
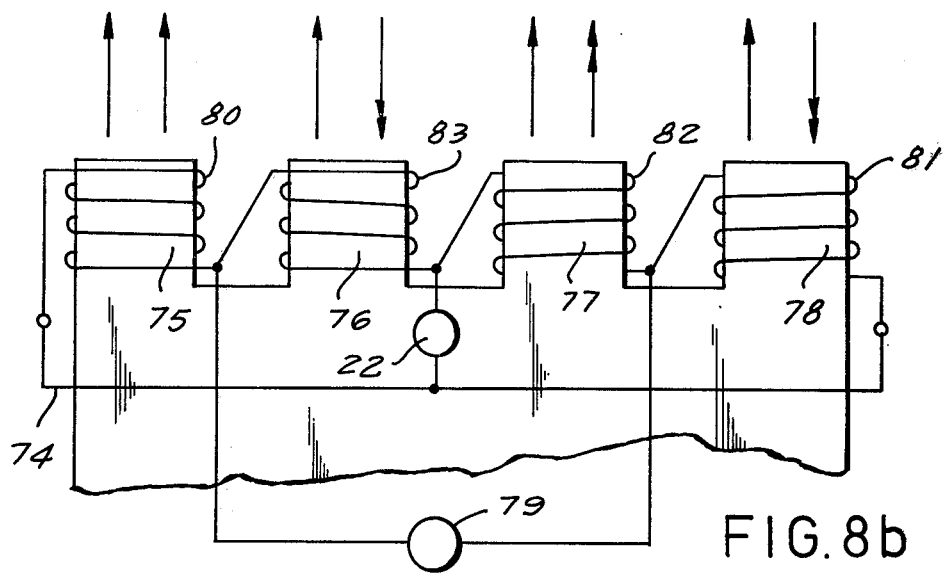

In FIG. 8b is shown the electric diagram of an electromagnetic system 74 having four coils wound around the four partial pole pieces 75–78 as drawn in FIG. 8b and connected to two sources 22 and 79. These sources can be either both exciter sources, or both control sources or one of each type. The coils are connected with the sources 22 and 79 in a bridge circuit. If the known formulas for bridge balance are satisfied the connecting points of the second source 79 are so located that no voltage of the first source 22 is present at these connecting points and vice versa. The four coils can be wound, as in FIG. 8b, each around one of four partial surfaces of a pole shoe and so connected together that they are traversed by the exciter current of source 22 (arrows in FIG. 8a) in such a manner that the corresponding magnetic flux emerges in the same direction from all four partial surfaces (arrows in FIG. 8b). In this connection, they are so traversed in the circuit of FIG. 8a by the currents of the control source 79 (arrows with two arrow heads) that two opposite coils 80 and 82 from both sources have the same direction of flow and the other two opposite coils 15 and 18 from both sources have the opposite direction of flow.

The coils 80 and 82 therefore produce on the part of the control system a magnetic flux in the same direction as the exciter system (arrows with double arrow heads in FIG. 8b) and the coils 83 and 81 produce a magnetic flux in a direction opposite to the exciter system.

Instead of the four partial surfaces of FIG. 8b one can also use an arrangement with only two partial surfaces of the pole shoe; the two coils 80 and 82 are wound around the one partial surface and the coils 81 and 83 are wound around the second partial surface as shown in FIG. 9. Then the direction of flux of both systems is the same in the one partial surface and the direction of flux of both system is different in the second partial surface, as shown in FIG. 2.

FIG. 8b shows that magnetic fluxes of both circuits pass through each coil and produce inductive effects there. When developing the electromagnets, therefore, the inductive coupling between the two circuits must be sufficiently small. This is achieved in accordance with the invention by means of the pole shoe, the partial surfaces, and the coils being so developed, arranged, and connected together that the different inductive couplings in all participating circuits so compensate each other that the processes in each circuit are practically independent of the processes in the other circuits.

An example shows that this is possible but requires special dimensioning.

In the bridge circuit of FIG. 8a it must be noted that there is a magnetic coupling between the four coils. The bridge balance which produces the uncoupling between the two circuits must therefore be adjusted with due consideration to the inductive coupling between the four coils.

The bridge circuit can be easily applied to pole shoes having arrangement by means of which this is possible in a very simple way using four identical partial surfaces as shown in FIG. 7. For this purpose four identical coils are wound around the partial surfaces in a manner that the inductive couplings also have a corresponding symmetry, whereby the bridge equilibrium and at the same time freedom from moment of rotation results.

A control source can also be developed in such a manner that it feeds a measuring instrument which is connected to the coils of the control system so that the measuring instrument measures the inductance of the coils of the control system and thereby in a known manner measures the distance between pole shoe and armature. The result of the measurement can be used in magnetic bearings in known manner to stabilize the distance between pole shoe and armature.

In this measurement also there are of particular use those parts of the invention which serve for uncoupling the different circuits and preventing the drive process and/or stabilization process, by induction transferring of disturbing voltages into the measuring process, and falsifying the result of the measurement, with the effect that the stabilization process is thereby impaired.

A system in accordance with the invention in which a drive process (exciter system), a stabilizing process (control system) $B_2$, and a measuring process take place simultaneously in a pole shoe with corresponding coils would be an arrangement, such as described, with two control sources, since each measuring instrument contains a feeding source. A measuring process which contains a measurement frequency which is substantially different from frequencies which are used in the exciter systems of the same electromagnet is advantageous.

Other examples without moment of rotation requiring only two partial surfaces are shown in FIGS. 10a and 10b in which a first partial surfaces 70 completely or almost completely surrounds a second partial surface 71. One of the coils (not shown) required for the control system is wound around the inner partial surface 71 and lies in the space 72. The second coil (also not shown) may have different positions, for instance, it may be wound on the outside around the partial pole piece 70.

FIG. 10a shows an example in which the outer partial surface 70 surrounds the inner partial surface 71 in an annular form, and the space 72 extends along a closed curve. A preferred form which produces particularly small moments of rotation because of its symmetry is a concentric arrangement with circular rings. FIG. 8b shows an example having an incompletely closed outer partial surface 70. In case of division into two partial surfaces it is always necessary for the partial surface 70 substantially to surround the partial surface 71.

Figure 11:
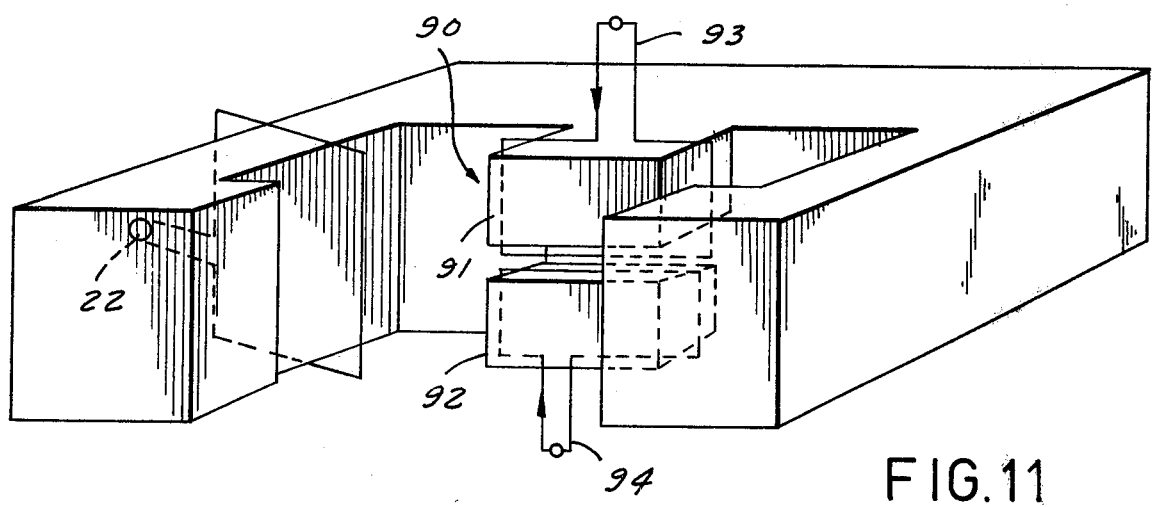

In a further example one of the pole shoes 90 is divided longitudinally into two partial pole pieces 91 and 92. Each pole pieces is coupled with a control coil 93 and 94 respectively, FIG. 11.

Figure 12:
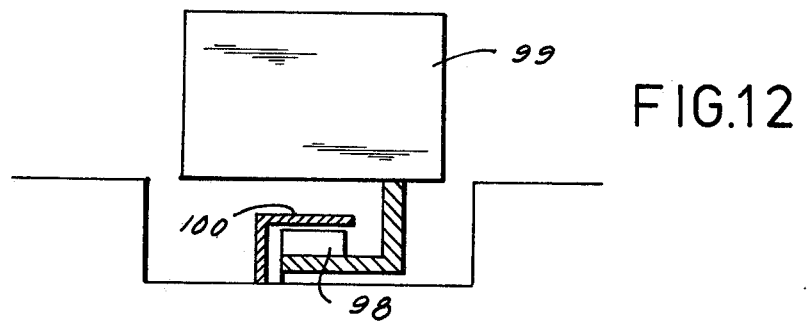

As an example for the application of the invention a magnetically suspended track shown in FIG. 12 will be considered. A magnetizable yoke 98 is supposed to be attached to a track 99 and associated to with a rail like armature 100. This electromagnet supports the track in suspension, while the yoke slides below the armature during the voyage of the track maintaining a constant air gap between the pole shoes 101–103 of the yoke and the rail 100. In order to keep the system in a constant vertical position the magnetic force excerted by the electromagnet must be controlled constantly due to variations of the weight of the track and oscillations.

Figure 13:
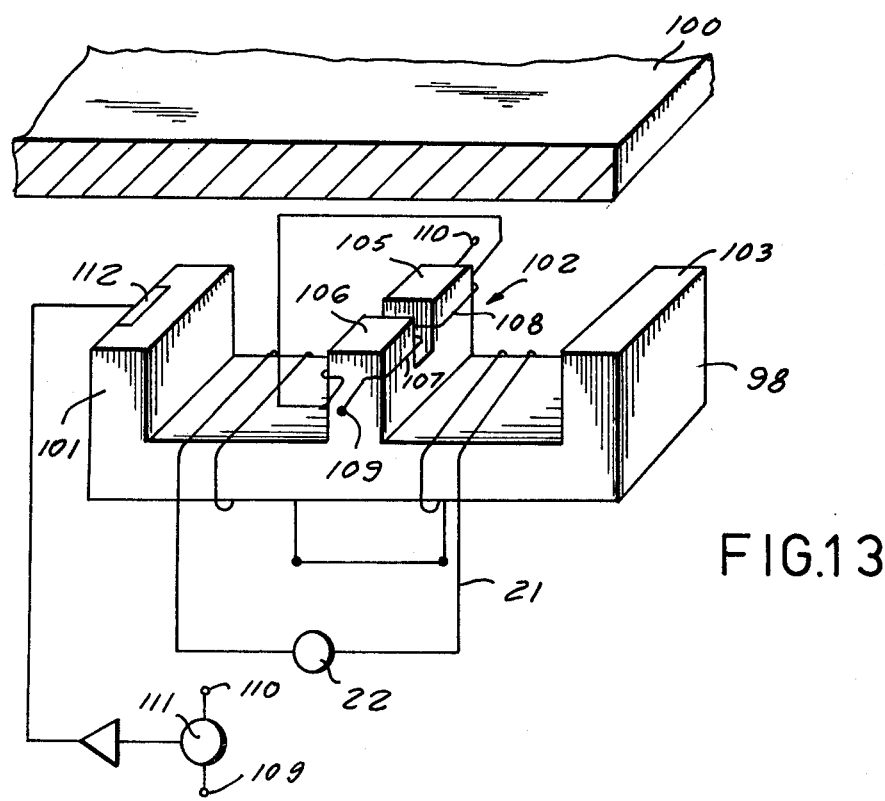

Considering first a conventional electromagnet having an exciter coil 21 arranged as shown in FIG. 13, the control of the system must be performed by varying the exciter current in accordance with the weight change of the track.

That is, the force is on one the hand proportional to $I^2$ (I being the current) and must be on the other side hand proportional to the weight W of the track. From here the dependence between the current and the weight can be deduced and hence the current variation to be applied to the coil can be calculated. Considering W for the weight of passenger entering or coming out of the track then I has the following function:

$$\Delta I = \sqrt{\frac{W}{a}} \left[ \sqrt{1 + \frac{\Delta W}{W}} - 1 \right]$$

where a is a constant.

It can be seen that I depends on the weight W which is actually also a function of the passengers being in the track.

Applying now the invention to the support system one could subdivide the pole shoe 102 into two partial pole pieces 105 and 106 and apply two coils 107 and 108 connected in series as drawn in FIG. 13. The points 109 and 110 of the coils are connected to a control source 111 drawn separately.

In this case the actual supporting force will be produced by the magnetic field arising from the exciter coil whereas the required additional forces are produced by the control coil system. The control current $I_2$ is controlled with aid of a sensing means 112 arranged near the air gap at the end of the pole shoes. A variation in the distance of the air gap is sensed by the sensing means and supplied via an amplifier to the control source 111. This current has in contrast to the conventional case a much simpler expression and is not dependent on the weight of the track:

$$I_2 = \frac{\sqrt{\Delta W}}{b}$$

where b is a constant.

The invention has been shown and described in preferred form only, and by way of example, and many variations may be made in the invention which will still be comprised within its spirit. It is understood, therefore, that the invention is not limited to any specific form or embodiment except insofar as such limitations are included in the appendend claims.

What is claimed is:

1. An electromagnet comprising:
   (a) a magnetizable yoke carrying at least two pole shoes,
   (b) an exciter system, for magnetizing said yoke, including an exciter coil and an exciter source for energizing said exciter coil,
   (c) a magnetizable armature arranged between said pole shoes and movable with respect to said shoes,
   (d) the end surface of at least one of said pole shoes being divided into at least two discontinuous partial surfaces separated by a space, each partial surface forming the end surface of a partial pole piece,
   (e) a control system associated with each pair of partial pole pieces, each control system including control coils and a control source for energizing said coils, a control coil surrounding each partial pole piece, and said control source being completely independent of said exciter source, and
   (f) said control system being so formed and arranged that the magnetic flux applied to each of the associated pair of partial pole pieces is of equal magnitude, and the total magnetic flux produced by said control coil system emerging in one direction from said one pole shoe equals the total magnetic flux produced by said control coil system entering said one pole shoe in the opposite direction.

2. An electromagnet as defined in claim 1 including a plurality of coils and a control source for each coil, said partial surfaces, space, and coils being so formed and arranged that the force exerted by each partial surface on said armature is dependent only on one of said control sources and is substantially independent of the other control sources.

3. An electromagnet as defined in claim 1 wherein there is a relatively small constant spacing at any one time between said armature and said one pole shoe, and a plurality of control coil systems associated with said pole shoe such that the sum total magnetic flux passing into and out of said pole shoe is substantially equal to zero when account is taken of the different directions of flux flow.

4. An electromagnet as defined in claim 3 wherein the end surface of said one pole shoe is divided into two discontinuous partial surfaces, and a control coil is wound around each of said surfaces, said coils being electrically interconnected, said partial surfaces and coils being so arranged that the flux produced by said control sources passing through each partial surface is equal to the flux passing through the other partial surface.

5. An electromagnet as difined in claim 3 wherein the end surface of said one pole shoe is divided into two identically shaped partial surfaces separated by said space, said pole shoe and armature being symmetrical with respect to said space, and two identical control coils being around said two partial surfaces, respectively.

6. An electromagnet as defined in claim 5 wherein said two control coils also form part of said exciter coil system, said coils being connected in series for feeding by one of said sources and connected in parallel for feeding by the orther of said sources.

7. An electromagnet as defined in claim 1 wherein said partial surfaces and control coil systems are so arranged that the moments of rotation exerted on said armature by said control systems substantially balance each other out.

8. An electromagnet as defined in claims 1 wherein the end surface of said one pole shoe is divided into three partial surfaces one of which is between the other two, and including control coils associated with said partial surfaces for producing magnetic flux in said middle partial surface which is opposite in direction to the direction of flux in the other two partial surfaces.

9. An electromagnet as defined in claim 1 wherein one of said partial surfaces at least almost completely surrounds the other partial surface, and at least one control coil is located within said space and wound around said inner partial surface.

10. An electromagnet as defined in claim 1 wherein the end surface of said one pole shoe is divided into at least four partial surfaces, and including two control coil systems, said surfaces and coil system being so arranged that:
   in a first of said partial surfaces the fluxes produced by said exciter coil system and two control coil systems are all in the same direction,
   in a second of said partial surfaces the fluxes produced by said exciter coil system and one of said control coil systems are in the same direction, but the flux produced by the other control coil system is in the opposite direction,
   in a third of said partial surfaces the fluxes produced by said exciter coil system and said other control coil system are in the same direction, but the flux produced by said one control coil system is in the opposite direction, and
   in a fourth of said partial surface the fluxes produced by said two control systems are in the same direction, but the flux produced by said exciter coil system is in the opposite direction.

11. An electromagnet as defined in claim 10 wherein said partial surfaces and coil systems are so arranged that the total force exerted on said armature by said pole shoe consists of three partial forces, each partial force being dependent only upon the current from one of said coil systems.

12. An electromagnet as defined in claim 1 wherein some or all the coils of each coil system also form part of another coil system.

13. An electromagnet as defined in claim 1 including a plurality of control coils equal in number to an intergral number multiple of four, all of said control coils being connected to both the exciter source and a control source, and said control coils being so arranged that the currents in each coil from one source are independent of the currents from the other source.

14. An electromagnet as defined in claim 13 wherein said four coils are connected together in a bridge circuit, and said two sources are connected to opposite points of the bridge.

15. An electromagnet as defined in claim 14 wherein said coils are so formed and arranged that the terminals of one source are free of the voltage of the other source.

16. An elctromagnet as defined in claim 15 wherein the end surface of said one pole shoe is divided into at least four partial surfaces, said coils being so wound around said four partial surfaces that the flux produced by the control source and the flux produced by the exciter source pass through two of said partial surfaces in the same direction, and pass through the other two partial surfaces in opposite directions.

17. An electromagnet as defined in claim 1 wherein the end surface of said one pole shoe is divided into two partial surfaces, and including coils of said exciter and control systems surrounding each partial surface, said coils being so arranged that the currents through the coils surrounding one partial surface are in one direction and the currents through the coils surrounding the other partial surface are in the opposite direction.

18. An electromagnet as defined in claim 15 wherein the end surface of said one pole shoe is divided into four partial surfaces arranged at the corners of a rectangle, and four identical coils surrounding said four partial surfaces, said coils being arranged in a bridge circuit.

19. An electromagnet as defined in claim 1 including a measuring instrument in one of said control coil systems for measuring the inductance of at least one coil of that system to thereby indicate the distance of its respective pole shoe from said armature.

20. An electromagnet as defined in claim 19 including means responsive to said measurement for controlling the distance between the pole shoe and said armature.

21. An electromagnet as defined in claim 19 wherein said measuring instrument includes a power source of constant frequency, said frequency being different from the frequencies of said exciter coil system and said control coil system.

* * * * *